United States Patent [19]

Hair

[11] 4,219,941
[45] Sep. 2, 1980

[54] MOISTURE BARRIER FOR FRUIT DRYING TRAYS AND THE LIKE

[76] Inventor: Lester E. Hair, 1175 N. Frankwood, Reedley, Calif. 93654

[21] Appl. No.: 26,764

[22] Filed: Apr. 3, 1979

[51] Int. Cl.³ .................. F26B 19/00; E02D 19/12
[52] U.S. Cl. ........................................ 34/93; 34/238; 47/9; 47/33; 52/102; 52/169.14; 248/508; 273/27; 405/258
[58] Field of Search .............. 34/93, 237, 238; 52/102, 169.1, 169.14; 405/258; 135/3 E, DIG. 7; 248/500, 508; 272/3; 273/27

[56] References Cited

U.S. PATENT DOCUMENTS

| | | | |
|---|---|---|---|
| 419,370 | 1/1890 | Smart | 34/93 X |
| 2,939,468 | 6/1960 | Boyce | 248/508 |
| 3,065,947 | 11/1962 | Thompson | 248/508 |
| 4,124,982 | 11/1978 | Fuller | 405/267 X |

FOREIGN PATENT DOCUMENTS

| | | | |
|---|---|---|---|
| 162208 | 3/1955 | Australia | 52/169.1 |
| 2303013 | 7/1974 | Fed. Rep. of Germany | 52/102 |
| 7510090 | 5/1977 | Netherlands | 273/27 |

*Primary Examiner*—Albert J. Makay
*Assistant Examiner*—Harold Joyce
*Attorney, Agent, or Firm*—Huebner & Worrel

[57] ABSTRACT

A barrier to minimize the percolation of moisture under fruit drying trays and the like, the barrier having a continuous panel of substantially impervious material folded to form walls positionable in peripherally conforming relation to a tray and being of sufficient rigidity to permit them to be inserted downwardly into the soil to form a subsurface barrier to moisture in the conforming relation.

5 Claims, 5 Drawing Figures

MOISTURE BARRIER FOR FRUIT DRYING TRAYS AND THE LIKE

BACKGROUND OF THE INVENTION

1. Field of the Invention

The present invention relates to a moisture barrier for fruit drying trays and the like and more particularly to such a moisture barrier which operates in use to prevent moisture from percolating under fruit drying trays, which diverts flowing surface water around fruit contained on such trays so as to minimize its destructive potential even during unexpected precipitation and which allows material evaporation to remove moisture from the fruit itself.

2. Description of the Prior Art

Characterizing the closest prior art of which the Applicant is aware and in compliance with 37 C.F.R. §1.97 and §1.98, attention is invited to the following patents, copies of which are enclosed:

| 1,538,957 | Smith | May 26, 1925 |
|---|---|---|
| 3,097,077 | Melikian | July 9, 1963 |

The Smith U.S. Pat. No. 1,538,957 is directed to a fruit evaporator designed to receive fruit for drying.

The Melikian U.S. Pat. No. 3,097,077 relates to a fruit drying tray.

Conventional practice in the drying of fruit, such as grapes to form raisins, calls for the fruit to be deposited on trays for drying by exposure to the sun. In the San Joaquin Valley of California the drying season for raisins extends over several months from as early as August to as late as November. Although the crop may require only a three week period for drying, labor difficulties as well as weather problems frequently prevent setting the crop out early in the season, or completing the drying process rapidly. While normally this season is sufficiently early to avoid damgage by precipitation, unexpected rains during this season have been known to cause severe damage to the crop. On occasion, virtually the entire crop has been destroyed because of early rains.

A variety of processes and devices have been developed in an effort to protect the crop during the drying season or to recondition a crop which has been damaged by moisture. It has been known, for example, to cover the crop on trays in various ways to protect it from rain. However, such arrangements tend to promote the condensation of moisture within the cover which is itself destructive to the crop. Furthermore, the Applicant has discovered that a substantial portion of the damage caused to raisins is as a result of the percolation of moisture under the trays where deposited in the field. This phenomenon causes two conditions to exist which are destructive to the raisins. First, such moisture depletes the latent heat contained in the soil beneath the tray. This latent heat is itself a substantial factor in drying the crop. Secondly, such moisture promotes the development of mildew which is also destructive to the crop. Additionally, it is known that the damage caused to the crop by rainfall primarily occurs as a result of moisture which cannot evaporate. Thus, subjection of the crop to direct rainfall is not so harmful where the moisture can run off and evaporate in a normal manner.

Therefore, the Applicant has discovered that it would be desirable to have a moisture barrier for fruit drying trays and the like which prevents the percolation of moisture under the trays which direct flowing surface water away from the fruit on the trays, which permits any water falling directly on the trays to run off in the normal fashion and the residual moisture to be removed by natural evaporation, and which can be produced in massive quantities at an extremely low cost per unit to permit board usage in the industry.

SUMMARY OF THE INVENTION

Therefore, it is an object of the present invention to provide an improved moisture barrier for fruit drying trays and the like.

Another object is to provide such a moisture barrier which operates to prevent the percolation of moisture through the soil under fruit drying trays so as to preserve the latent heat contained in the soil for use in drying the fruit and so as to prevent the creation of a condition conducive to the growth of mildew in association with the tray which is destructive to the drying crop.

Another object is to provide such a moisture barrier which operates to direct surface moisture away from the fruit set out for drying on the tray.

Another object is to provide such a barrier which permits any moisture falling directly on the crop to drain off the crop and tray and permits normal evaporation of the residual moisture to take place so as to eliminate conditions conducive to the growth of mildew.

Another object is to provide such a moisture barrier which operates to seal the edges of the tray against the seepage of moisture about and under the tray.

Another object is to provide such a moisture barrier which operates additionally to retain the tray in position so as to prevent wind from folding loose portions of the tray over the fruit in a manner interferring with drying conditions, which operates additionally as a barrier to dust, trash and other deleterious materials which may be blown over the earth's surface so as to assist in providing a sanitary environment for drying of the fruit.

Another object is to provide such a moisture barrier which can be used by field workers with little or no training.

Another object is to prvide such a moisture barrier which can be mass-produced at minimal cost per unit so as to permit wide usage in the industry.

A still further object is to provide such a moisture barrier which can be constructed in several forms fully compatible with normal soil preparation and for use with trays of virtually any shape or size.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
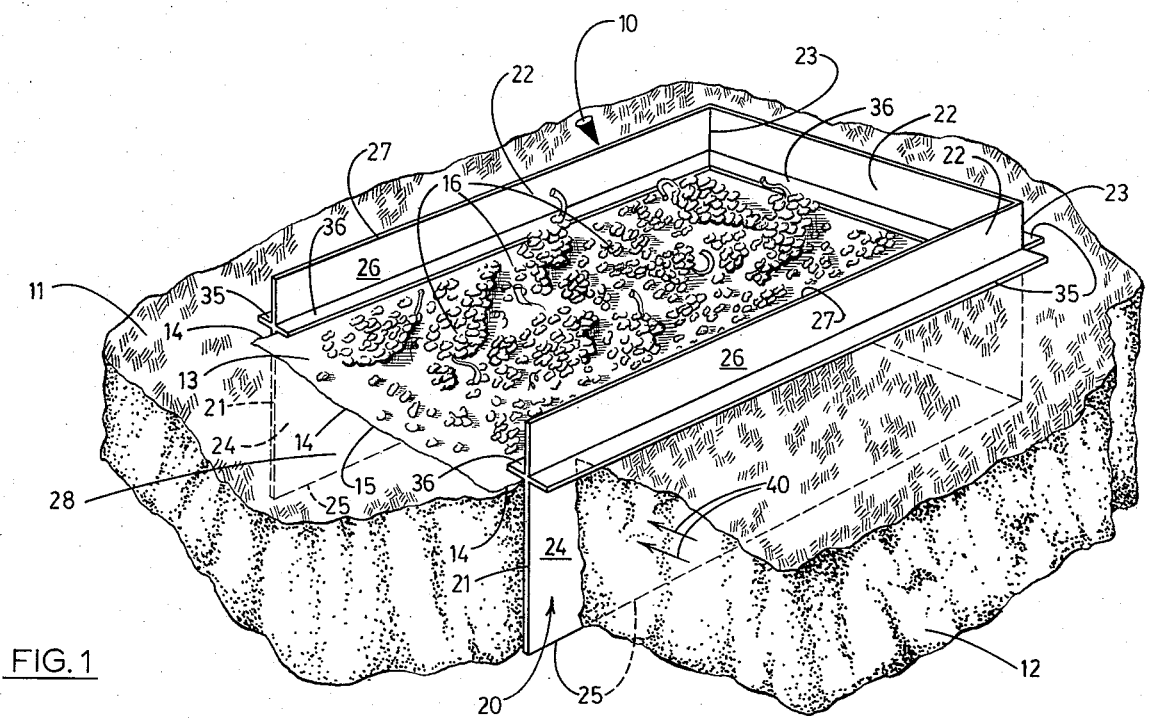
FIG. 1 is a fragmentary perspective view of the moisture barrier of the present invention shown in a typical operative environment.

Referring more particularly to the drawing, the moisture barrier of the present invention is generally indicated by the numeral 10 in FIG. 1. As shown in FIG. 1, the earth's surface 11 is graded so as to slope generally toward the lower left as viewed therein. In the case of drying fruit such as grapes to form raisins, it is common practice to grade the path between adjoining rows of grapevines so as to face the crop toward the sun and to provide drainage from the crop for any precipitation which may occur during the drying season. In any case, the subsurface soil, indicated at 12 in FIG. 1, is generally of a porous nature, due to frequent working consistent with sound agricultural practice. The subsurface soil thus readily absorbs moisture and permits percolation therethrough.

A fruit drying tray 13 is rested on the earth's surface 11, as shown in FIG. 1. The tray has four orthogonally related edges 14. The tray is rested on the earth's surface 11 oriented relative to the slope of the earth's surface so that the edge 14 on the lower left, as viewed in FIG. 1 constitutes a lowermost edge 15 for the tray. For illustrative convenience, grapes 16 are shown rested on the tray for drying by exposure to the sun.

The moisture barrier 10 has a panel 20 constructed of any suitable material. The specific material employed is preferably of a non-porous type. It is also preferred that the material have sufficient rigidity to permit it to be forced downwardly into the soil as will hereinafter be described. A variety of extrudable plastic substances are excellently suited to this purpose and the panel 20 and, in fact, the entire barrier 10 is thus preferably a single continuous plastic extrusion.

The panel has opposite ends 21 and is composed of three wall portions 22 defined by transverse course or fold lines 23. As shown in FIG. 1, the panel and wall portions have dimensions permitting them to be folded along fold lines 23 so as to conform to three contiguous edges 14 of the drying tray 13 with which the barrier is designed to be employed. It will be recognized, therefore, that the particular configuration shown in the drawing can be varied so as to permit such a fitted relationship with any particular tray with which it is designed to be used. For example, if the tray were circular, the panel 20 would have no fold lines but would be designed so as to be fitted circumferentially about a substantial portion of the periphery of such a tray. Similar variations in the specific configuration of the barrier make the barrier of the present invention adaptable to trays of all shapes, sizes and configurations.

Each wall portion 22 of the panel 20 has a first or subsurface portion 24 leading to a lower edge 25. Each wall portion has an extension, second or above surface portion 26 leading to an upper edge 27. The specific widths of the subsurface and above surface portions can be varied to some degree. However, it has been found that if the width of the subsurface portion is in the range of approximately two to five inches and the width of the above surface portion is in the range of approximately one half inch to one inch, the moisture barrier operates well in performing its intended functions. These widths are not, however, critical.

When the barrier 10 is positioned as shown in FIG. 1, the opposite ends 21 of the panels 20 define an open end or drain opening 28 for the barrier therebetween.

Figure 2:
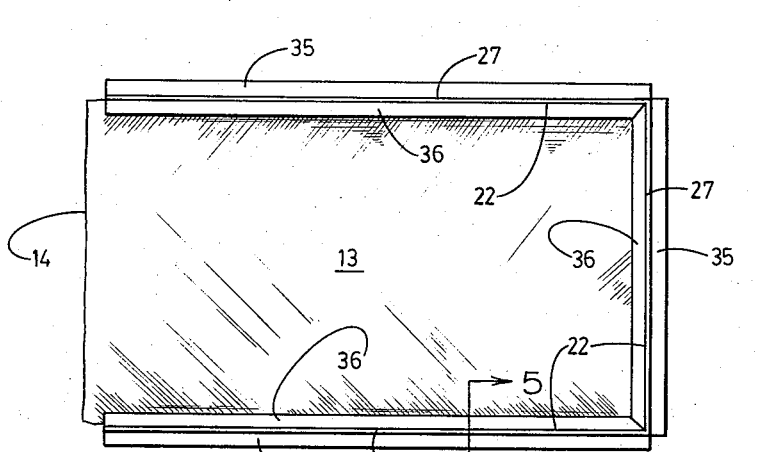
FIG. 2 is a top plan view of the moisture barrier.
Figure 5:
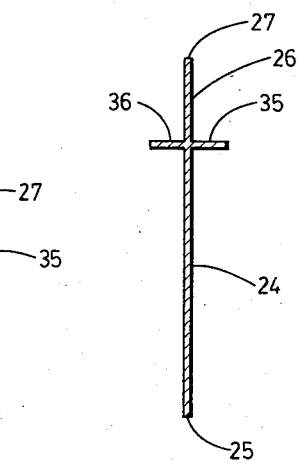
FIG. 5 is a transverse section taken on line 5—5 in FIG. 2.
Figure 3:
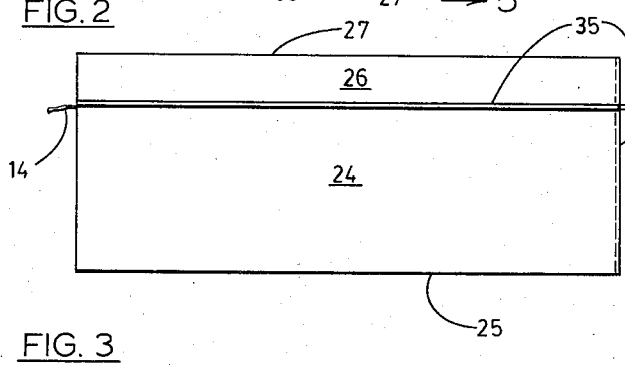
FIG. 3 is a side elevation of the moisture barrier.
Figure 4:
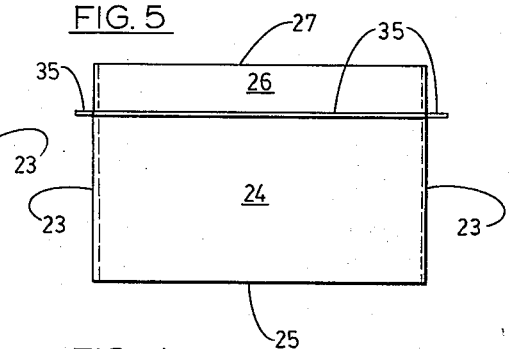
FIG. 4 is a rear elevation of the moisture barrier.

Each wall portion 22 mounts an outer flange or stop 35 extending laterally therefrom and serving to divide its respective wall portion between the subsurface and above surface portions 24 and 26 respectively thereof. Each wall portion mounts an inner flange or flap 36 in substantially coplanar relation with its respective outer flange or stop extending in the opposite direction, as best shown in FIG. 5. If the panel 20 has been formed as a single continuous extruded plastic piece, the flanges 35 and 36 can readily be formed during this extrusion process. The only adjustment necessary where this method of construction is employed is to cut a triangular section out of adjoining inner flanges 36 at the fold lines 23 so as to facilitate folding of the wall portions relative to each other as best shown in FIGS. 1 and 2. Alternatively, these adjoining portions of the flanges can simply be severed and overlapped to accommodate folding.

OPERATION

The operation of the described embodiment of the subject invention is believed to be clearly apparent and is briefly summarized at this point. Once the moisture barrier 10 has been found as described, it can readily be employed by field workers with little or no instruction. With a tray 13 rested on the earth's surface 11 bearing grapes 16 for drying, the field worker simply grasps the above surface portions 26 of the wall portions 22 and forces the lower edges 25 of the subsurface portions 24 through the earth's surface 11 and into the subsurface soil 22. Care need only be taken to insure that the lower edges 25 are forced downwardly into the soil immediately adjacent to the edges 14 of the tray, as best shown in FIG. 1. The field worker forces the wall portions into the soil until the outer flanges 35 engage the earth's surface and the inner flanges or flaps 36 overlap the edges 14 of the tray. No other adjustment or assembly is required.

When mounted in an operative position such as shown in FIG. 1, the moisture barrier 10 operates to prevent moisture from percolating from the adjacent soil under the tray. Arrows 40 are intended to indicate such percolation from the surrounding soil in the direction of the barrier. Since, insofar as is detrimental to drying, this action occurs only within the top several inches of soil, the subsurface portions 24 of the barrier need not extend into the soil to any great depth. Any water flowing over the earth's surface 11 is prevented from passing over the tray by the above surface portions 26 of the three wall portions 22. Since the open end of the moisture barrier is on the lower most side thereof, water does not flow in through the open end 28 of the barrier. Similarly, there is no appreciable percolation of moisture through the soil beneath the lowermost edges of the tray because of the slope of the earth's surface. In addition, rain falling onto the tray and grapes flow gravitationally off the tray through the open end. Since the tray and fruit rested thereon are exposed to the atmosphere, there is no problem of condensation. Similarly, once any such precipitation stops, normal evaporation achieves drying of the fruit and the tray so as to minimize the likelihood of mildew formation.

Where the moisture barrier 10 is to be used on level ground, an alternative configuration for the moisture barrier can be employed. In this form, the barrier has a fourth wall portion 22 extending across what is defined as the open end 28 of the barrier 10 in FIG. 1. The fourth wall portion prevents water from flowing inwardly over the tray 13 and prevents moisture from percolating through the soil 12 through what would otherwise be the open end 28. Where this form of construction is employed, perforations are preferably formed in the above surface portions of the wall portions to permit passage of any water falling on the tray outwardly therethrough.

Therefore, the moisture barrier of the present invention operates at minimal expense to protect fruit to be dried from damage by moisture both on the earth's surface and in the subsurface soil operating compatably with natural evaporative processes to achieve drying of the fruit without the further problem of condensation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A moisture barrier for a fruit drying tray having a predetermined periphery and rested on soil sloped downwardly to a low side, the barrier comprising a continuous, substantially rigid panel of material substantially impervious to moisture and having three portions adapted to be folded relative to each other so as to be positionable in conforming relation to said periphery of the fruit drying tray with said portions received in the soil on which the tray is rested to obstruct the percolation of moisture through the soil beneath the tray and having a drain opening at the surface of the soil at a portion of the periphery of the tray nearest said low side to afford drainage for moisture on the tray.

2. The moisture barrier of claim 1 wherein the panel mounts flaps extending longitudinally thereof for overlapping, facing engagement with the periphery of the tray when positioned in said conforming relation to form a barrier to moisture.

3. The moisture barrier of claims 1 or 2 wherein said portions of the panel have extensions extending above the soil in said conforming relation forming a barrier to moisture on the surface of the soil.

4. A moisture barrier for controlling the flow of surface and subsurface moisture relative to a fruit drying tray rested on the earth, the barrier comprising a continuous, substantially flat panel of substantially rigid material impervious to moisture having opposite lateral edges and opposite surfaces and adapted to be folded along a pair of courses extending in spaced relation transversely of the panel to form side walls for the barrier disposed in substantially orthogonal relation to an end wall therebetween and a drain opening bounded by said side walls remote from the end wall; and a flange mounted on corresponding surfaces of each wall extending longitudinally thereof between the lateral edges of the panel to define a subsurface portion extending from said flange to one of said lateral edges of the panel and an above surface portion extending from the flange to the opposite lateral edge of the panel and extending outwardly from its respective panel for overlapping engagement with a peripheral edge of a fruit drying tray when said subsurface portions of the walls are forced into the earth in conforming relation to the periphery of the tray.

5. The moisture barrier of claim 4 wherein each wall of the panel mounts a second flange on the surface of the panel opposite that mounting the first flange and rigidly deployed for engagement with the earth when the subsurface portions of the walls are forced into the earth a predetermined desired distance.

* * * * *